3,597,405
POLYTETRAFLUOROETHYLENE POWDER AND METHOD FOR MAKING THE SAME
Yutaka Kometani, Takarazuka-shi, Shun Koizuma, Osaka, and Takeshi Suzuki, Takeaki Nakajima, and Chuzo Okuno, Osaka-fu, Japan, assignors to Daikin Kogyo Co., Ltd., Osaka, Japan
Filed Apr. 17, 1967, Ser. No. 631,442
Claims priority, application Japan, Apr. 21, 1966, 41/25,567
Int. Cl. C08f 1/84, 3/24, 45/04
U.S. Cl. 260—92.1
4 Claims

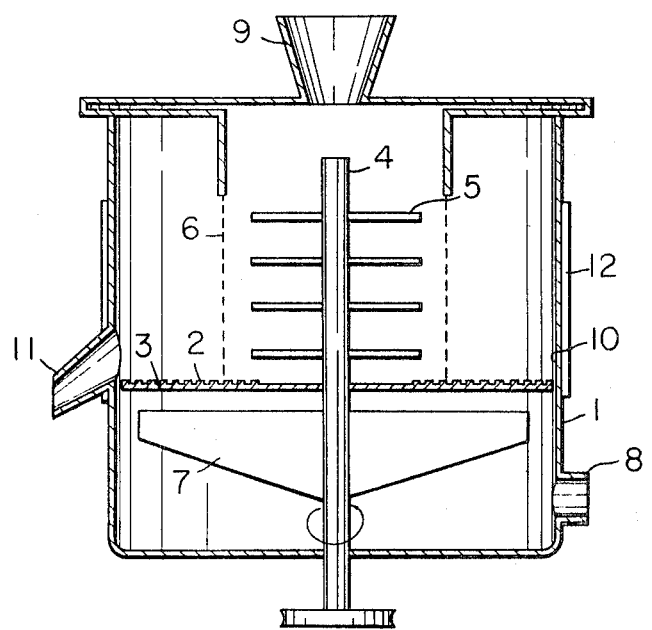

ABSTRACT OF THE DISCLOSURE

A process for the preparation of agglomerated polytetrafluoroethylene powder of good powder flow properties, having particle diameters ranging 100–5,000 microns and an angle of repose of not greater than 45°.

---

This invention relates to polytetrafluoroethylene powder of good flow properties and which is well adapted to form moulded products of high density or such polytetrafluoroethylene powder containing a filler or fillers uniformly mixed therein and methods for preparation thereof.

Because polytetrafluoroethylene is moulded in a manner similar to powder metallurgy unlike other thermoplastic resins which are mouldable, for example, by melt extrusion, melt injection or thermal pressing, its moulding powder is required to possess a number of unique properties.

For example, first the powder should have good flow properties and second, each of the powder particles should be uniformly soft and capable of intimate mutual adhesion under a pressure of 50 kg./cm.$^2$ or above. Thirdly the powder should have high bulk density, and fourthly in case the powder contains a filler or fillers, they should be uniformly mixed. The first requirement is mainly for easier handling. Powder having good flow properties and no tendency for aggregation can be uniformly and easily filled into metallic mould. Particularly for moulding with automatic moulding machines, good flow properties are essential. The second requirement is important because if the powder articles are hard, or non-uniformly hard and incapable of mutual intimate adhesion under pressure, sintered moulded products therefrom will contain voids and thus products of high density cannot be obtained. The third requirement is not always applicable. For instance, for making thin articles powder of low bulk density is rather preferred. Generally, however, for making products of same shape, powder of higher bulk density is mouldable with smaller metallic mould. For example in case of making same columnar bodies from powders having bulk density of respectively 0.25 and 0.5, the latter can be moulded with a metallic mould of ½ height that of the mould for the former. The fourth requirement is also important because when the filler is not uniformly mixed in, products of non-uniform quality will be obtained.

Examining the heretofore proposed or commercialized powders from these points, polytetrafluoroethylene powder having relatively good flow properties and high bulk density, viz., the powder sufficiently, although not perfectly, meeting the above first and third requirements is composed of hard particles, failing to meet the second requirement. Therefore from the same only products containing many voids are obtainable. Again other known polytetrafluoroethylene powder, viz., the powder containing fibrous particles at a high ratio and having a particle size of no greater than 50 microns, a shape factor of 5–12 and an anisotropic expansion factor of 1.16–1.28, has poor flow properties due to the fine and fibrous particles, and low bulk density such as below 0.3, thus failing to fulfill the first and third requirements.

We carried out a great number of experiments on polytetrafluoroethylene powder and filler-containing polytetrafluoroethylene powder to find that in order to fill and compress the powder in metallic mould without any difficulty for manual or automatic moulding thereof, the later-specified angle of repose of the same powder must be no greater than 45°. Furthermore we found that the conventionally prepared powders tend to cause retardation of powder flowage or non-uniform filling of metallic mould due to objectionable bridging during moulding, inter alia, moulding with automatic moulding machines. Also polytetrafluoroethylene powder or filler-containing polytetrafluoroethylene powder should preferably have a bulk density of no less than 0.4. Conventionally, in order to make polytetrafluoroethylene of high bulk density, either the crude grains obtained by polymerization under specific conditions are ground with any suitable grinding machine under mild grinding conditions or the polymer-water slurry is cut under mild grinding conditions using a mixer and the like. Therefore the hard core or nucleus present in the crude polymeric grain remains intact in the resultant particles without receiving any grinding or dividing action. Consequently thus obtained powder particles are hard and incapable of mutual adhesion during moulding, producing only porous moulded products containing many voids. Whereas, concerning filler-containing polytetrafluoroethylene powder, heretofore no product having a high bulk density is known. Thus polytetrafluoroethylene powder or filler-containing polytetrafluoroethylene powder having a bulk density of 0.4 or above and which is capable of forming moulded products of high density has been heretofore unknown.

The object of the present invention is to provide polytetrafluoroethylene powder or polytetrafluoroethylene powder containing a filler or fillers uniformly mixed therein which completely satisfy the requirements not met by the conventionally prepared powders. In other words, the object of the present invention is to provide polytetrafluoroethylene powder or polytetrafluoroethylene powder containing a filler or fillers uniformly mixed therein having good flow properties and a narrow particle size distribution, which are easy for handling, readily mutually adherable under relatively low pressure and consequently are capable of giving moulded products of high density.

We discovered that polytetrafluoroethylene powder or filler-containing polytetrafluoroethylene powder having a bulk density no less than 0.4, an angle of respose of no greater than 45° and excellent powder flow properties and which is capable of forming moulded products of high density can be prepared by the steps of making a wet matter by adding to polytetrafluoroethylene powder of particle diameters no greater than 300 microns obtained by grinding crude polytetrafluoroethylene grains, after optional uniform mixing-in of a filler or fillers, 0.1–1.5 parts, based on the weight of the polytetrafluoroethylene or the sum weight of the polytetrafluoroethylene and the filler, of an organic liquid having a boiling point of 0–200° C., and (secondarily) agglomerating the same to powder having particle diameters of 100–5,000 microns by high speed tumbling at a temperature of 0–150° C. and at a filling ratio of not greater than 0.2. We furthermore found that for such tumbling agglomeration, use of a granulation apparatus of the type in which the agglomeration is performed as the particles are tumbled on a rotating disk-formed body is advantageous.

The measurement of "angle of repose" referred to in the present specification is done by quietly flowing the powder to be measured through a stainless steel funnel having an inner diameter at the top of 40 mm., that at the bottom of 6 mm. and a height of 40 mm. and which is provided with an orifice of 6 mm. in inner diameter and 3 mm. in length at the exit, the distance between the exit and the floor being 20 mm. The powder is piled up on the floor until the top of the pile touches the exit of the funnel. As the powder piles up in approximately the conical form, the radius $r$ of the bottom thereof is measured, and from the result the angle of repose is calculated in accordance with the following equation.

$$\text{Angle of repose } \theta = \tan^{-1}\left(\frac{20}{r}\right)$$

For the measurement of such angle of repose, the sample powder should be thoroughly removed of humidity and static electricity in advance. Furthermore, the measurement is performed at 23° C. Percentages given in this specification are by weight, unless otherwise indicated.

Measurement of "steam permeability" is carried out as follows. The sample powder 300 g. is pre-formed in a metallic mould of 70 mm. in inner diameter under a pressure of 300 kg./cm.$^2$ and placed in an electric oven equipped with a stirrer with a temperature rise at the rate of 150° C. per hour up to 370° C. and sintered for 8 hours at 370° C., followed by temperature fall at the rate of 40° C. per hour down to room temperature. From the resultant block having a diameter of about 70 mm. and a height of about 80 mm., tape of 0.1 mm. thickness is shaved off by means of a lathe, and the tape is subjected to steam permeability test in accordance with the procedure E of ASTM E96–63T (in which the temperature is made 40° C.). The unit is g./m.$^2$, 24 hrs.

Also "dielectric breakdown voltage" is measured by interposing the polytetrafluoroethylene film of 0.1 mm. thickness prepared in the similar manner to that for the sample for the above steam permeability test between spherical electrodes of 12.5 mm. diameter, exerting thereon a load of 500 g. and subjecting the same to voltage having a frequency of 60 cycles and a crest factor of between 1.34 and 1.48, with the voltage rise at a rate of 1000 v. per second. The measurement is performed at forty different positions at 50 mm. intervals on the film, and the arithmetical mean value is calculated from the results.

The characteristics of the polytetrafluoroethylene powder particles of the invention are that they are granule formed powder particles having excellent flow properties, specific surface area for nitrogen adsorption by BET adsorption isotherm of 2–6 m.$^2$/g. and angle of repose of no greater than 45°. The powder has the particle diameters of 100–5000 microns, inter alia, 200–2500 microns, containing substantially no particles greater than 6,000 or more preferably, 5,000 microns in diameter. Still other characteristics of the powder are that the greatest part of the particulate powder is composed of the secondary agglomerates of primary particles having an average diameter of no greater than 300, preferably 200, microns, that it has a bulk density no lower than 0.4, and furthermore that the moulded products therefrom are voidless and have high densities, as demonstrated by the steam permeability of no higher than 5.0 g./m.$^2$. 24 hrs.

The high density of the moulded products from the polytetrafluoroethylene powder of the invention can be substantiated by, besides the above steam permeability, the fact that observation of a thin piece of about 10$\mu$ thickness shaven off from the moulded block by means of a microtomer with an optical microscope of above 100× finds no void, as well as by the dielectric breakdown voltage, measured as to the film under the conditions specified in Example 3, of 6,000 v./0.1 mm.–13,000 v./0.1 mm., the arithmetic mean of more than 40 times' measurement being above 9,000 v./0.1 mm.

The "filler" referred to in the invention means the powdery substances to be mixed with polytetrafluoroethylene with the view to improve the properties of polytetrafluoroethylene such as abrasion resistance and creep resistance as well as to reduce the cost of the material. Generally used such filler include, for example, glass powder, glass fiber powder, carbon powder, copper powder, molybdenumdisulfide powder, graphite powder, bronze powder, asbestos powder, mica powder, quartz powder, alumina powder and other various inorganic materials or metal oxides. Those may be used singly or as mixtures of two or more of the different powders.

The amount of the filler as above is appropriately 40% by weight or below, to the total amount of the filler-containing polytetrafluoroethylene powder, preferably 25% by weight or below. Generally the less the amount of the filler, the easier the granulation or agglomeration. The granulation becomes very difficult with the filler content of above 40% by weight.

Now the process of the invention and the resultant agglomerated powder will be explained in further details.

The shape of the polytetrafluoroethylene powder serving as the starting material of the invention is not critical, which may be fibrous or non-fibrous, but the powder is required to have an average particle diameter of no greater than 300$\mu$, preferably no greater than 200$\mu$. Such particulate powder can be prepared by grinding the polymeric powder obtained from, for example, polymerization of tetrafluoroethylene in the presence of water containing a reaction initiator or ionic irradiation of tetrafluoroethylene at gaseous or liquid phase, in the presence of water or at dry state, with a grinder such as hammer, mill, that having a blades-attached rotor, that utilizing hydraulic energy or that with cutting blades, etc., until the desired average diameter is obtained. In case of polymerizing tetrafluoroethylene in the presence of water, it is particularly recommended that it should be performed by suspension process in the presence of a free radical reaction initiator. Again it is likewise possible to employ polytetrafluoroethylene from emulsion polymerization as the starting material of the subject process. Since the polytetrafluoroethylene from emulsion process is obtained as fine particles of about 0.2$\mu$, the same can be used directly as the starting material without the above-described grinding.

This material powder having an average particle diameter of no greater than 300$\mu$ is optionally mixed with the filler, and first is wetted with a liquid for wetting polytetrafluoroethylene, said liquid having a surface tension at 25° C. of no greater than 35 dynes/cm. As such liquid, for example, aliphatic hydrocarbons such as hexane, heptane, gasoline and kerosene or mixtures thereof; aromatic hydrocarbons such as benzene, toluene, o-, m-, and p-xylene; alcohols such as ethanol, methanol, isopropanol, tertiary butanol, allyl alcohol, ethylene glycol, benzyl alcohol and cyclohexanol; ethers such as ethyl ether,, anisol, tetrahydrofurane and dioxane; aldehydes such as paraldehyde, diethylacetal and acrolein; ketones such as acetone, cyclohexanone and methyl ethyl ketone; halogen derivatives such as chloroform, carbon tetrachloride, allyl iodide, ethylene dibromide, chloral, dichloroacetic acid, acetyl chloride, monochlorobenzene and benzyl chloride; and fluorinated hydrocarbons such as 1,1,2-trichlorotrifluoroethane, 1 - monofluoro - 1,1,2 - trichloromethane, 1,2-difluorotetrachloroethane, 1,1-difluoro tetrachloroethane, octafluorocyclobutane, $Cl(CF_2CFCl)_nCl$, $H(CF_2CF_2)_nCH_2OH$, $Cl(CF_2CF_2)_nCl$ (in the foregoing three formulae, $n$ being an integer of 1–100), ω-monohydroperfluorohexene, benzotrifluoride, o-, m-, and p-monochlorobenzotrifluoride, 1,2-dibromotetrafluoroethane and 1,1,2-trichloropentafluoropropane, may be named. It is sufficient to use such a liquid in an amount enough to completely wet the material powder. Use of greater amount than the above is economically objectionable, while the liquid shortage causes the failure in compete agglomeration during the subsequent granulation step. Normally it is appropriate to use the liquid at the ratio of 0.1–1.5 parts by weight per part of the polytetrafluoroethylene powder (in case the powder contains the filler, per part of the filler/polytetrafluoroethylene mixture). However, so far as the powder is perfectly wetted, the precise amount of the liquid is not critical. The preferred type of the liquid for the object of the invention is that having a boiling point within the range of 0–200° C., inter alia, 30–150° C. The agglomerates obtained with the use of wetting agent having a boiling point below 0° C. are not completed of agglomeration, giving only inferior product incapable of withstanding shocks in transportation, since they are pulverized under even very small external force.

Thus obtained wet polytetrafluoroethylene powder or filler-containing polytetrafluoroethylene powder is then tumbled, in optional presence of water, at room temperature or above, in a later-specified mode and at the later-specified speed. The treating temperature can be optionally selected, that between 0°–150° C. being preferred.

Generally "tumbling of particles" refers to the state in which each of the particles move around while rotating, with or without mutual contact or that with the container walls. We engaged in extensive researchers on the tumbing agglomeration of polytetrafluoroethylene powder or filler-containing polytetrafluoroethylene powder to discover that the mode of tumbling and speed (the speed of the particles' rotative transfer) significantly affect the properties of the resultant agglomerated product.

For instance, tumbling accompanied with mutual contact of the particles as observed in conventional granulation process using V-type or C-type blender adversely affects the agglomerates, because when the secondary particles already imparted with the suitable size (100–5,000µ) by agglomeration of the primary particles are allowed to tumble around contacting with each other, they tend to further agglomerate to have still greater sizes, forming as the result objectionable masses or giving a product of wide particle size distribution, containing many large particles of 3,000–7,000µ. Furthermore in case of filler-containing polytetrafluoroethylene powder, while the secondary particles agglomerate and disintegrate under the tumbling action, separation of the filler from the polytetrafluoroethylene particle takes place. In fact, when 30 liter of a wet 1:1 mixture of polytetrafluoroethylene particles and carbon tetrachloride was tumbled at 60° C. using a conventional V-type blender of 50 liter capacity having high speed rotatable (1000 r.p.m.) blades provided at the inside, the resultant product contained many objectionably large particles of 3,000–7,000µ, and furthermore the particles were polygonal granules quite remotely resembling the sperical form. Again when the filler-containing polytetrafluoroethylene powder was similarly treated, the product likewise contained large particles and furthermore the filler which was initially uniformly mixed with polytetrafluoroethylene was partly separated, forming a non-uniform mixture. This result is clearly attributable to the fact that the tumbling mode given by V-type blender provides ample occasions for mutual contacts and friction of the particles, which causes undesirable over-growth in the particle size. This will be explained in still further details in our description of the dish-type granulation apparatus which is advantageously employable in the invention, in the later-appearing working examples.

As the result of our researchers based on the above-described facts, we found that for the ideal granulation or agglomeration of polytetrafluoroethylene powder or filler-containing polytetrafluoroethylene powder, among the many modes of tumbling, that in which each of the particles move along the inner walls of the container or that in which the particles move around with rotation substantially without contacting each other or walls, are effective. Accordingly in this invention a care is taken to minimize the mode of tumbling accompanied by mutual contact and friction of the particles. This is achieved by reducing the apparent volume ratio of the wet polytetrafluoroethylene powder or filler-containing polytetrafluoroethylene powder to the effective capacity of the body of the granulation apparatus (which will be referred to as "filling ratio"). To wit, for the agglomeration of polytetrafluoroethylene powder or filler-containning polytetrafluoroethylene powder in accordance with the invention, it is preferred to make the filling ratio always no greater than 0.2, particularly than 0.15, in case of the filler-containing polytetrafluoroethylene powder, that of no greater than 0.1 being particularly preferred. Consequently in accordance with the agglomeration method of the invention the amount of the wet matter treatable in one operation unit is very small, and therefore batch-type apparatus is inappropriate, but those of continuous-type are suitable.

In the agglomeration of polytetrafluoroethylene powder or filler-containing polytetrafluoroethylene powder, the tumbling speed is an important factor for controlling the particle size distribution and the hardness of the particles in the resultant product. When the tumbling speed is unduly low, many objectionably large particles, particularly masses of above 6,000 microns in size, are formed and as the result from the resultant agglomerated polytetrafluoroethylene powder or filler-containing polytetrafluoroethylene powder moulded articles of high density cannot be obtained. On the other hand, too great a tumbling speed causes the formation of relatively small size particles of below 5000µ with a very narrow particle size distribution. Accordingly, it is necessary in this invention to employ a tumbling speed appropriate for the formation of the object product. No means for precise measurement of the tumbling speed of the particles being presently available, it is presumed that the tumbling speed given to the particles is proportional to the speed given to the driving means of the granulation apparatus (which may be in the form of rotation vibration, or combination of the two). Generally speaking, the tumbling speed in this invention presumably is within the scope of so-called high speed.

Thus the agglomeration of the invention being performed under high speed tumbling, the staying time of the powder in the granulation apparatus should preferably be short. Long staying time prolongs the tumbling time and causes breaking down of the agglomerated particles and the product polytetrafluoroethylene powder or filler-containing polytetrafluoroethylene powder tends to have poor flow properties. In this invention staying time of 1–120 seconds, particularly 1–60 seconds, is preferred for the agglomeration of polytetrafluoroethylene powder, and that of 1–30 seconds, for the filler-containing polytetrafluoroethylene powder.

Among the apparatuses useful for granulation, those known for giving relatively high speed tumbling action are V-type blender having high speed rotatable blades attached to its inside, and later-described dish-type granulation apparatus. The V-type blender however being inappropriate as to the mode of tumbling and tumbling time as above explained, in this invention a granulation apparatus of the type in which the powder is tumbled on horizontally rotating dish-formed body is employed. (Hereinafter this type will be referred to as dish-type granulation apparatus.) In the dish-type granulation apparatus, polytetrafluoroethylene powder is fed onto its horizontally set dish or disk-formed body which is rotating at high speed, and tumbled to be agglomerated. As this type of apparatus presently marketed, "Marumerizer" manufactured by Fuji Denki Kogyo Co., Japan, is well known.

The attached drawing shows the vertical section of such dish-type granulation apparatus, "Marumerizer."

Referring to the drawing, the apparatus consists of a fixed cylindrical container 1, a disk 3 having many projections 2 on the upper surface and which is the bottom of the cylindrical container 1 and rotates around the axis 4, cutters 5 provided on the axis 4 and above the disk 3 and which rotate simultaneously with the disk 3 (composed of multi-folded blades), a non-rotatable cylindrical screen 6 fixed in the cylindrical container 1, surrounding the cutters concentrically with the disk 3, a fan 7 coaxially provided below the disk 3 and which rotates simultaneously with the disk 3, and an air inlet 8. In the apparatus the parts which come into contact with the powder are made of stainless steel. The polytetrafluoroethylene powder wetted with the organic liquid is fed into the apparatus through the hopper 9 provided at the upper part of the cylindrical container 1, first cut with the cutters 5, spattered outwardly to pass through the screen 6, and tumbled contacting with the upper surface of the disk 3 or with the inner wall 10 of the cylindrical container 1, or tumbled in the space between the inner wall 10 and the screen 6 while the powder particles contact with each other. Thus agglomerated product is withdrawn from the exit 11 which is normally shut and provided on the side wall of the cylindrical container 1, while the rotation of the disk 3 is continued. Therefore the tumbling time can be freely controlled and if necessary feeding of the wetted matter and withdrawal of the agglomerated product can be done continuously. The treating temperature can be controlled by means of a band heater 12 mounted around the cylindrical container 1.

The filling ratio of polytetrafluoroethylene powder or filler-containing polytetrafluoroethylene powder wetted with the organic liquid to the above-described granulation apparatus can be optionally changed by controlling the amount of feed and withdrawal of the product. Again the tumbling speed can be optionally changed by controlling the rotation speed of the rotatable disk by means of a gearbox. In performing the agglomeration in accordance with thhe subject process using the above dish-type granulation apparatus, the preferred circumferential speed of the disk 3 (dish-formed body) is 8–50 m./sec., particularly 16–40 m./sec., and in case of filler-containing polytetrafluoroethylene, particularly 12–36 m./sec.

The water and organic liquid used for practicing the invention are not necessarily refined to high purity level, but if either of them contain inorganic or organic impurities, such will remain in the polytetrafluoroethylene powder obtained, and as the result cause undesirable coloration of the product or lowering of the product's dielectric breakdown voltage. Therefore it is desirable to remove such impurities in advance.

Hereinafter the main modes of practicing the invention will be explained with reference to working examples.

EXAMPLE 1

Polytetrafluoroethylene powder having an average particle diameter of $35\mu$ of commercial grade was mixed with the varied organic liquids as indicated in Table 1, at the ratios indicated in the same table. The mixing was performed with a conventional ribbon mixer for about 5 minutes. Thus obtained wetted polytetrafluoroethylene were then treated in the above-described "Marumerizer" in which the diameter of the disk 3 was 395 mm., that of the screen 6, 250 mm., that of the screen holes, 2 mm., and total of 14 cutters were furnished on the axis into four directions. The wet matter was continuously fed from the hopper of the apparatus, and in the meantime the agglomerated product was continuously withdrawn from the powder exit. By varying the rotation speed of the rotatable disk (circumferential speed), the tumbling speed was controlled to different values. "Staying time" means the time during which the powder stayed in the granulation apparatus, which was controlled by varying the diameter of the exit opening. The filling ratio was controlled by varying the amount of feed and that of withdrawal. The temperature was controlled by heating the apparatus by means of the band heater provided around the main body of the apparatus.

The agglomerated powders withdrawn from the apparatus were dried for 20 hours at 100° C. and examined of their properties.

The results are given in Table 1 together with the respective agglomeration conditions. In the same table, Run Nos. 1, 2, 3 and 4 are within the scope of the subject process, and the products are proved to possess excellent properties. Run Nos. 5, 6 and 7 are controls, in which Run No. 5 produced a product incomplete of agglomeration, and the products of Run Nos. 6 and 7 contained large quantities of objectionable blocks of over $5,000\mu$ in size.

TABLE 1

| Run No. | 1 | 2 | 3 | 4 | 5 + | 6 | 7 |
|---|---|---|---|---|---|---|---|
| Agglomeration conditions: | | | | | | | |
| Liquid used | Carbon tetrachloride | Carbon tetrachloride | Acetone | p-Xylene | Ethanol | Carbon tetrachloride | Acetone |
| Liquid/polymer (weight ratio) | 0.7 | 0.6 | 1.0 | 0.7 | 0.7 | 0.8 | 0.6 |
| Temperature (° C.) | 20 | 40 | 30 | 20 | 20 | 40 | 30 |
| Circumferential speed (m./sec.) | 28 | 24 | 32 | 43 | 54 | 32 | 28 |
| Staying time (sec.) | 2 | 30 | 10 | 40 | 40 | 90 | 140 |
| Filling ratio | 0.05 | 0.1 | 0.067 | 0.15 | 0.1 | 0.3 | 0.3 |
| Properties of agglomerated product: | | | | | | | |
| Particle size ($\mu$) | 700 | 800 | 600 | 500 | | | |
| Bulk density (g./cc.) | 0.55 | 0.6 | 0.6 | 0.55 | 0.4 | 0.5 | 0.6 |
| Angle of repose (°) | 36 | 37 | 38 | 40 | 46 | 48 | 46 |
| Tensile strength (kg./mm.$^2$) | 2.5 | 2.4 | 2.6 | 2.5 | 2.6 | 2.6 | 2.5 |
| Elongation, percent | 240 | 220 | 250 | 260 | 240 | 250 | 230 |
| Properties of moulded product: | | | | | | | |
| Steam permeability (g./m.$^2$, 24 hrs.) | Not greater than 5.0 | 220 | 250 | 260 | 240 | 250 | 230 |
| Nitrogen adsorption specific surface area (m.$^2$/g.) | 3.2 | 220 | 250 | 260 | 240 | 250 | 230 |
| Dielectric breakdown voltage (kv./0.1 mm.) | 1.1 | 1.0 | 1.0 | 1.0 | 1.0 | 1.1 | 1.0 |
| Remarks | | | | | Not agglomerated | Blocks of over 5,000 $\mu$ contained | |

EXAMPLE 2

Tetrafluoroethylene was polymerized in the presence of water containing a free radical reaction initiator, and the product was separated and dried to give crude polytetrafluoroethylene powder. Then the same was ground by means of 3 horsepower Ultramizer (product of Fuji Denki Kogyo Co., Japan), 3 horsepower Micron Mill (product of Hosokawa Tekkojo, Co., Japan), Jet-O-Mizer (product of Fluid Energy Processing Equipment Co., U.S.A.) and .1 horsepower Sample Mill (Fuji Denki Kogyo Co.). Thus obtained ground powders were respectively made Samples A, B, C and D. The respective grinding conditions and the properties of the samples are shown in Table 2, together with those of a commercial grade powder (Sample E).

The above-mentioned grinding apparatuses will be briefly explained as follows:

Ultramizer: A grinder of the type in which the grinding is performed mainly by impact force exerted by breaking action of a hammer.

Micron Mill: A grinder of the type in which the grinding is performed mainly by shearing force exerted by rotation of blades-attached rotor.

Jet-O-Mizer: A grinder which grinds with the cutting action of high speed gas jet.

Sample Mill: A grinder which grinds with impact force of a hammer similarly to Ultramizer, the hammer having a smaller circumferential speed than that of Ultramizer.

With each one part of thus obtained polytetrafluoroethylene powders, 0.7 part by weight of toluene was mixed by means of a ribbon mixer, and the resultant method matters were continuously fed into the same dish-type granulation apparatus mentioned in Example 1. The temperature was 30° C., the circumferential speed of the disk was 32 m./sec., and the filling ratio was 0.067.

The agglomerated product was continuously withdrawn from the said granulation apparatus and dried at 150° C. to be removed of the solvent. All the products except that from Sample D had excellent flow properties. Their properties together with those of polytetrafluoroethylene of commercial grade having a bulk density of 0.55 are shown in Table 3.

TABLE 3

| | | Properties of agglomerated product | | | | Properties of shaped article | | | |
|---|---|---|---|---|---|---|---|---|---|
| Run No. | Sample | Bulk density (g./cc.) | Particle size ($\mu$) | Angle of repose (degrees) | Nitrogen adsorption specific surface area ($m^2/g$.) | Steam permeability ($g./m^2$ 24 hrs.) | Dielectric breakdown voltage (kv./0.1mm.) | Tensile strength ($kg./mm.^2$) | Elongation, (percent) |
| 8 | A | 0.55 | 650 | 35 | 3.8 | 1.8 | 1.1 | 2.1 | 310 |
| 9 | B | 0.65 | 600 | 38 | 4.0 | 1.2 | 1.0 | 2.6 | 290 |
| 10 | C | 0.60 | 500 | 36 | 3.8 | 0.9 | 1.0 | 2.3 | 300 |
| 11 | D | 0.40 | 520 | 48 | 2.1 | 4.0 | 0.5 | 2.5 | 250 |
| 12 | E | 0.50 | 630 | 32 | 2.5 | 1.0 | 0.9 | 2.4 | 270 |
| 13 | (*) | 0.55 | 500 | 50 | 1.5 | 35 | 0.2 | 2.0 | 230 |

*Polytetrafluoroethylene of commercial grade having a bulk density of 0.55.

EXAMPLE 3

The same polytetrafluoroethylene powder used in Example 1 was mixed with glass powder of about $8\mu$ in diameter and $50\mu$ in average length, at the ratios of each 0.2 part and 0.15 part by weight of the latter per part of the polytetrafluoroethylene powder by means of a conventional Henschel-mixer, and thus polytetrafluoroethylene powders containing a filler uniformly mixed therein were obtained, which were then mixed with varied types of organic liquids as indicated in Table 4 at the indicated ratios, and subsequently were agglomerated by the same means as described in Example 1.

The mixing ratio of the filler was 0.15 part in Run Nos. 15 and 19, and 0.2 part in the rest. The agglomeration conditions and the properties of the resultant products are also given in Table 4. Run Nos. 14, 15, 16 and 17 are within the scope of this invention, and it can be understood that their products exhibit excellent properties. Run Nos. 18, 19 and 20 are controls, the products of Run Nos. 18 and 20 being incomplete of agglomeration and that of Run No. 19 containing a large quantity of objectionable blocks over $5,000\mu$ in size.

TABLE 2

| | Grinding conditions | | | Properties of powder | | | |
|---|---|---|---|---|---|---|---|
| Sample | Type of apparatus | Number of rotations of main axis (r.p.m.) | Classifier | Particle size ($\mu$) | Bulk density (g./cc.) | Angle of repose (degrees) | Form of particle |
| A | Ultramizer | 6,000 | Centrifugal type. | 15 | 0.25 | 47 | Non-fibrous. |
| B | Micron mill | 5,000 | Basket type | 30 | 0.20 | 50 | Fibrous. |
| C | Jet-O-Mizer | | | 25 | 0.25 | 48 | Non-fibrous. |
| D | Sample mill | 3,000 | None | 500 | 0.30 | 50 | Do. |
| E | Polytetrafluoroethylene of commercial grade. | | | 150 | 0.35 | 47 | Do. |

TABLE 4

| Run No | 14 | 15 | 16 | 17 | 18 | 19 | 20 |
|---|---|---|---|---|---|---|---|
| Agglomeration conditions: | | | | | | | |
| Liquid used | Carbon tetrachloride. | Carbon tetrachloride. | Acetone. | Toluene. | Carbon tetrachloride. | Carbon tetrachloride. | Carbon tetrachloride. |
| Liquid/polymer (weight ratio) | 0.6 | 0.7 | 0.5 | 0.7 | 0.7 | 0.6 | 0.6. |
| Temperature (° C.) | 20 | 30 | 40 | 40 | 20 | 20 | 20. |
| Circumferential speed (m./sec.) | 20 | 22 | 30 | 40 | 54 | 20 | 54. |
| Staying time (sec.) | 2 | 15 | 10 | 35 | 30 | 10 | 140. |
| Filling ratio | 0.05 | 0.05 | 0.067 | 0.15 | 0.05 | 0.3 | 0.067. |
| Properties of agglomerated product: | | | | | | | |
| Particle size (μ) | 700 | 650 | 500 | 500 | | | |
| Bulk density (g./cc.) | 0.6 | 0.6 | 0.5 | 0.6 | 0.4 | 0.5 | 0.6. |
| Angle of repose (°) | 37 | 36 | 39 | 40 | 47 | 48 | 48. |
| Tensile strength (kg./mm.²) | 2.6 | 2.7 | 2.8 | 2.7 | 2.6 | 2.7 | 1.6. |
| Elongation, percent | 300 | 320 | 300 | 300 | 310 | 320 | 300. |
| Properties of moulded product: | | | | | | | |
| Steam permeability (g./m.² 24 hrs.). | | | | | | | |
| Dielectric breakdown voltage (kv./0.1 mm.). | | | | | | | |
| Remarks | | | | | Not agglomerated. | Containing blocks of over 5,000 μ. | Incomplete of agglomeration. |

Reference 1

A V-type blender of about 50 liter capacity provided with a jacket around its external wall, an inside stirrer which is rotatable coaxially with the rotating axis of the blender, and furthermore with a vacuum line of which inside can be made vacuous, was used. With this apparatus, temperature is controllable by continuously feeding steam to the jacket with no necessity for suspending rotation, and the blender container and the inside stirrer can be simultaneously rotated at different rates to the same or reverse directions. The vacuum passage is so designed that removal of air therefrom can be continued even during the rotation of the blender. The inside stirrer has a structure in which 4 long square rods (one side being about 5 mm.) are fixed to the axis in parallel with, and around, the axis at the positions about 8 cm. distant from the axis, by means of each 2 supports and furthermore, auxiliary 8 short square rods are fixed to the axis each by means of one support in parallel with the axis, at the positions about 8 cm. distant from the axis. All the portions of the apparatus which come into contact with the powder are made of stainless steel.

Agglomeration treatment was performed using the V-type blender provided with the stirrer as above-described. The material polytetrafluoroethylene powder was the same to that used in Example 1.

The procedure of the treatment was as follows. The material polytetrafluoroethylene powder 10 kg. was fed into the blender and after addition thereto of 5 kg. of carbon tetrachloride, the blender was air-tightly closed. (The filling ratio was about 0.4.) Steam was fed to the jacket to provide a temperature of 60° C., and thereafter the main body of the blender was rotated at the rate of 28 r.p.m., and the inside stirrer, at the rate of 800 r.p.m., in the same direction both for 5 minutes. The wetting agent was recovered through the vacuum line and the temperature was lowered by supplying water to the jacket. Thus agglomerated powder was withdrawn and dried for 24 hours at 60–70° C. This powder was made Sample B and the product of Run No. 1 of Example 1 was made Sample A, their properties being compared as in Table 5.

TABLE 5

| Sample | A | B |
|---|---|---|
| Particle size (μ) | 700 | 1,500 |
| Content of particles greater than 4 mesh (4,760 μ), percent | 0 | 10 |
| Bulk density (g./cc.) | 0.55 | 0.55 |
| Angle of repose (degrees) | 36 | 43 |
| Tensile strength (kg./mm.²) | 2.5 | 2.1 |
| Elongation, percent | 240 | 200 |
| Steam permeability (g./m.² 24 hrs.) | <5.0 | >5.0 |
| Dielectric breakdown voltage (kv./0.1 mm.) | 1.1 | 0.5 |

From Table 5 it can be understood that Sample B powder is generally inferior in the physical properties compared with Sample A powder. Particularly as demonstrated by the large content of the particles of sizes above 4760μ such as 10%, Sample B has a wide particle size distribution and for this reason shows inferior tensile strength and elongation to those of Sample A, and its steam permeability neither is satisfactory.

Reference 2

Using the V-type blender employed in Reference 1, polytetrafluoroethylene powder containing 0.2 part by weight of the glass powder used in Example 3 per part of polytetrafluoroethylene as the filler was agglomerated in the same manner as of Reference 1. The resultant powder was made Sample D, and the powder obtained from Run No. 14 of Example 3 was made Sample C, their properties being compared as in Table 6.

TABLE 6

| Sample | C | D |
|---|---|---|
| Particle size (μ) | 700 | 1,500 |
| Content of particles greater than 4 mesh (4,760 μ), percent | 0 | 10 |
| Bulk density (g./cc.) | 0.6 | 0.55 |
| Angle of repose (degrees) | 37 | 45 |
| State of sheet* | Good | Poor |
| Tensile strength (kg./mm.²) | 2.6 | 2.1 |
| Elongation, percent | 300 | 200 |

* When sheet of 1–2 mm. thickness is moulded by means of hot coining, if the glass powder and the polytetrafluoroethylene powder are separated, the sheet shows white spots. The state of "good" indicates the absence of such spots, and "poor" indicates the appearance thereof.

As is apparent from Table 6, Sample D obtained with the use of V-type blender is inferior in physical properties when compared with Sample C obtained in accordance with the invention, and in which polytetrafluoroethylene powder is separated from the filler. From this fact it can be understood that for agglomeration of filler-containing polytetrafluoroethylene powder V-type blender is inappropriate, and the method of agglomeration on a rotating disk-formed body is suited.

We claim:

1. A process for the preparation of agglomerated polytetrafluoroethylene powder of good powder flow properties having particle diameters of 200–2500 microns, an angle of repose of not greater than 45°, and a specific surface area of 2–6 m.²/g. and a bulk density of not less than 0.4 and which is capable of giving shaped articles having a steam permeability of not greater than 5.0 g./m.²·24 hours and a dielectric breakdown voltage of 6,000–13,000 v./0.1 mn., which comprises tumbling a wetted matter composed of 1 part by weight of polytetrafluoroethylene powder having particle diameters not greater than 200 microns and 0.1–1.5 parts by weight of an organic liquid having a boiling point of 30–150° C., and a surface tension at 25° C. of not greater than 35 dynes/cm., in a granulation apparatus containing a disk-formed body which horizontally rotates with a circumferential speed of 8–50 m./sec., at a filling ratio of not higher than 0.15 and at a temperature of 0–150° C. for from 1 to 60 seconds.

2. A process for the preparation of agglomerated polytetrafluoroethylene powder of good powder flow properties having particle diameters of 200–2500 microns, an angle of repose of not greater than 45°, a specific surface area of 2–6 m.$^2$/g. and a bulk density of not less than 0.4 and which is capable of giving shaped articles have a steam permeability of not greater than 5.0 g./m.$^2$·24 hours and a dielectric breakdown voltage of 6,000–13,000 v./0.1 mm., which comprises continuously feeding a wetted matter composed of 1 part by weight of polytetrafluoroethylene powder having particle diameters of not greater than 200 microns and 0.1–1.5 parts by weight of an organic liquid having a boiling point of 30–150° C. and a surface tension at 25° C. of not greater than 35 dynes/cm., into a granulation apparatus containing a disk-formed body which horizontally rotates with a circumferential speed of 8–50 m./sec., at a filling ratio of not higher than 0.15, tumbling the same to the granulation apparatus for from 1 to 60 seconds at a temperature of 0–150° C. to whereby agglomerate the same, and thereafter continuously withdrawing the agglomerated powder to outside the granulation apparatus.

3. The process of claim 1 wherein the said polytetrafluoroethylene powder contains up to 40% by weight of filler.

4. The process of claim 2 wherein the said polytetrafluoroethylene powder contains up to 40% by weight of filler.

References Cited

UNITED STATES PATENTS

| | | | |
|---|---|---|---|
| 3,046,263 | 7/1962 | Whitlock | 260—92.1 |
| 3,290,412 | 12/1966 | Goldblum | 260—873 |
| 3,366,615 | 1/1968 | Miller | 260—92.1 |
| 3,265,679 | 8/1966 | Black III et al. | 260—92.1 |

MORRIS LIEBMAN, Primary Examiner

R. ZAITLEN, Assistant Examiner

U.S. Cl. X.R.

260—33.4, 33.6, 33.8, 41